2,711,394

United States Patent Office

2,711,394
Patented June 21, 1955

2,711,394

INORGANIC GEL-THICKENED GRAPHITE FORGE DIE LUBRICANT

Franklin Veatch, Lyndhurst, and Ernest C. Milberger, Maple Heights, Ohio, assignors to The Standard Oil Company, Cleveland, Ohio, a corporation of Ohio No Drawing. Application July 12, 1954,
Serial No. 442,902

15 Claims. (Cl. 252—30)

This invention relates to improved graphite-containing lubricants, and more particularly relates to a lubricant which is especially adapted for the lubrication of heated metallic surfaces, such as encountered with forge dies in forging and extrusion processes, and which is composed essentially of a stable and uniform suspension of graphite in a mineral lubricating oil and is thickened by a finely-divided inorganic thickener such as a silica aerogel.

Forging lubricant compounds are graphite-containing oils which are intended for application to hot forging and piercing dies and to other tools for use in the hot forging of metals and at times applied to the piece to be forged, such as iron, steel, copper, brass and aluminum, and for the lubrication of extrusion dies in which such metals as aluminum, copper, brass and the like are extruded through heated dies. In the preparation of such lubricating compounds it is important to secure a uniform and stable suspension of the graphite in the lubricant since at the high temperatures at which the compounds are used the oil is largely dissipated and the graphite remains as the principal lubricant. It is important that the graphite-containing residue left on the die when the oil vehicle evaporates shall not cake or build up, and that the oil shall not decompose into a gummy or hard carbonaceous residue which would result in defects in the forging or extruded product. It is also important that the viscosity of the finished lubricant be such that the lubricant is thin enough to apply with a swab or brush and still thick enough that the lubricant will lie uniformly on the die until the oil is substantially evaporated leaving a uniform layer of graphite and/or until the material can be forged.

One of the major difficulties encountered in the compounding of lubricants in accordance with the above requirement is the tendency of the graphite to settle out of the lubricating oil, thereby resulting in a lack of uniformity in the lubricant and in its effectiveness. One of the prior methods of solving this problem resulted in overloading the oil with graphite in suspension so that if settling occurred sufficient graphite would still remain in suspension to function satisfactorily.

Other methods of overcoming this settling problem have resulted in the utilization of various dispersing agents as aids in the obtention of uniform suspensions of graphite in lubricating oils. Additives such as lard, beeswax, tallow, gelatinizing substances, heavy organic polymers, and heavy metal soaps such as the aluminum soaps, have been added in various amounts to decrease the settling tendency of the graphite. However, these additives have not proved entirely satisfactory in the obtention of a uniform and stable graphite suspension.

It is therefore an object of this invention to provide a fluid lubricating composition particularly adaptable for use in the forging and extrusion of metallic products.

It is also an object of this invention to provide a graphite-containing lubricant containing a relatively small amount of graphite.

It is a further object to describe a process for the preparation and the ingredients of an improved graphite-containing lubricant.

A still further object of the invention is to provide a lubricating composition which is particularly adaptable for use in the forging and extrusion of metallic products.

Another object is to provide a novel lubricant composition of a lubricating oil, graphite and stabilizing agents.

According to the present process, a lubricating base oil is admixed with a relatively small amount of an inorganic gelling and thickening agent, such as finely-divided inorganic silica, and powdered graphite. If desirable, a small amount of moisture-stabilizing agent also may be incorporated.

The base oil to be utilized in the forge die lubricant of the invention may be either light or heavy, the less viscous oils requiring greater quantities of the gelling agent, and the heavier oils requiring lesser amounts of the gelling agent, in order to obtain a stable lubricant composition having a final modified Furol viscosity of about 300 to 1000 seconds at 100° F. Any of the oil stocks exhibiting lubricating properties are generally satisfactory for the base stock of the lubricating composition, provided the lubricating oil has an initial viscosity at 100° F. between 1500 and 9000 seconds Saybolt Universal (S. S. U.), and may preferably be a bright stock of between 3000 and 5000 S. S. U.

The inorganic gelling agent to be used in making the lubricant in accordance with this invention may be any inorganic material which forms a gel with a lubricating oil and which is so finely-divided as to be nonabrasive. The preferred materials are the aerogels, which may be formed from any material not incompatible with oil, such as silica, alumina, and other gel-forming metal oxides, silica flour and the bentones.

A series of silica gels which can be used as the inorganic gelling agent of the invention are manufactured by Monsanto Chemical Company and marketed under the trade name "Santocel."

Santocel C is prepared from a sodium silicate solution in the following way: The solution is neutralized with sulfuric acid and then allowed to stand until the mixture sets to form a hydrogel. The by-product sodium sulfate is washed out by the repeated washings with water. The continuous water phase in this hydrogel is then replaced by continued washing with alcohol until an alcogel is formed. In order to remove the liquid phase without a collapse of the gel structure, the alcogel is placed in an autoclave which is then heated above the critical temperature of the alcohol and the pressure is allowed to increase to a point above the critical pressure of the alcohol. The vent valve is then opened and the alcohol allowed to escape. Under these conditions, the silica gel structure remains practically undisturbed and the liquid phase of the gel is replaced with air. The material is then reduced in particle size by blowing it through a series of pipes containing sharp bends with jets of compressed air. Santocel C has a secondary particle size about 3 to 5 microns.

Santocel A is prepared as set forth for Santocel C up to the point of removal of the product from the autoclave. This material is run through a continuous heating chamber where it is heated for ½ hour to a temperature of about 1500° F. to eliminate the last traces of volatile material. It is then broken down in a reductionizer or micronizer to a particle size of about 1/8 inch in diameter. The solids content of the original hydrogel used in preparing Santocel C is approximately 25% higher than that of Santocel A.

AR is a modification of A, differing only in that the material is reductionized to about the same particle size as C, approximately 3 to 5 microns in diameter.

ARD is a modification of AR, differing only in that

ARD is densified by extracting air under vacuum, and therefore has a smaller volume than AR.

AX is an A which has not been devolatilized.

CDv is a C which has been devolatilized as set forth for Santocel A. The Santocel is reductionized before being devolatilized.

CDvR differs slightly from CDv in that the CDvR has been devolatilized just after heating in the autoclave and then reductionized. It differs from CDv in that the latter is reductionized before being devolatilized.

The primary difference between the A and C series is as follows:

(1) The C's are prepared from a sodium silicate solution containing 25% more silica than the A's. Therefore, in general the A's are lighter and composed of smaller particles than the C's.

(2) The A's have undergone a devolatilization step in their preparation.

The following are the bulk densities of several of the preferred silica aerogels:

|  | Density, grams per ml. |
| --- | --- |
| AR | 0.029. |
| ARD | 0.056 to 0.064. |
| C | 0.082. |

In general, AR and ARD show superior gelling ability and the A's in general are better than the C's. Silica aerogels which have been devolatilized generally have a higher gelling efficiency than the undevolatilized aerogels.

Other types of inorganic gelling agents which may be used include a Fumed Silica marketed by B. F. Goodrich Company. It is finely divided and appears very much like an aerogel. It is made by a combustion or vaporization process, as a source of white "carbon black" for the rubber industry. The particles are several microns in size and porous in nature.

Another material is "Linde Silica Flour" marketed by Linde Air Products Co. It is very similar in physical appearance to the silica aerogel. The particle size of the silica is purported to be 0.01 to 0.05 micron and to be manufactured by burning silicon tetrachloride and collecting the combustion product on cool plates analogous to the production of carbon black. The particles are thought to be aggregates of clusters of particles rather than of sponge-like character.

Still another inorganic gelling agent known is "Ludox" silica from Du Pont, which is known as a silica sol, and silica derivatives thereof. It has a particle size of the order of 0.01 to 0.03 micron. In preparing the compositions of the invention it is necessary to remove the water from the sol and replace it with an oil. This is possible by formulating the sol and removing the water by flash distillation or azeotropic distillation.

The silicas from Columbia-Southern also are useful. These have the following properties:

| Wet Screen, Retained 325 Mesh, Percent | Brunauer-Emmett-Teller Nitrogen Adsorption Surface Area., m.²/gm. |
| --- | --- |
| 0.004 | 257.0 |
| 0.01 | 236.5 |
| 0.02 | ca. 210.0 |
| 0.008 | 215.5 |
| 0.004 | 228.0 |

While any inorganic silica type thickener may be used, an aerogel has been found to be particularly effective as the thickening agent for the lubricating composition, and the aerogel described as illustrative of the best mode of practicing the invention has the following properties:

| | |
| --- | --- |
| pH | 3.5–5.0. |
| Average secondary agglomerate particle size before simple mixing with the oil | 1–6 microns. |
| Average particle size after simple mixing with the oil | Max. about 0.25 micron. |
| $SiO_2$ | 93–96%. |
| Total volatiles (after heating at 800° C. for ½ hr.) | 0.5–4.0%. |

The silica aerogel possessing the above characteristics is prepared by adding sufficient sulfuric acid to a 5–8% sodium silicate solution (percent calculated as $SiO_2$ at the time of gel formation, i. e., after addition of sufficient acid to gel the solution) in order to produce the silica hydrogel, which is washed free of salts and excess sulfuric acid, and subsequently soaked in ethyl alcohol to produce the alcogel. The resulting alcogel is treated in an autoclave at a temperature and pressure above the critical temperature and pressure of ethyl alcohol, whereby the alcohol is converted into a gas without destroying the gel structure. Thereafter, the autoclave pressure is released in order to permit the ethyl alcohol gas to escape. The resulting aerogel is devolatilized by heating at a temperature of about 1500° F. for ½ hour, thereby ridding the aerogel of all traces of ethyl alcohol and other volatile organic matter. It is believed that the removal of this volatile organic matter is responsible at least in part for the improved gelling efficiency of this aerogel, as compared to the undevolatilized aerogels. The devolatilized aerogel is then reductionized to a secondary agglomerate particle size of about 1 to 6 microns. The reductionization step may be carried out in a whirling grinder or similar mechanism.

The aerogel prepared in accordance with the method defined above readily breaks down to a particle size of 0.25 micron or less merely by simple mixing with the oil, such as by hand mixing or mechanical mixing with a stirrer or paddle.

This unexpected reduction in particle size after simple mixing with the oil is not characteristic of aerogels prepared from silicate solutions containing more than 8% silicate concentrations. For example, an aerogel prepared from a 9.5% silicate solution is not appreciably broken down upon simple mixing. The devolatilized and reductionized silica aerogel prepared in accordance with the above description is known as "Santocel ARD."

The graphite utilized in the present invention is a powder screened to a fineness of 98±2% through a 200 mesh screen. This is the smallest particle size available that is larger than colloidal graphite, which is generally known to be unsuitable for forge die lubrication.

Where the composition is to be stored for long periods of time or utilized in places where there may be considerable moisture, a small amount of a stabilizer against moisture may be incorporated with the composition. For this purpose, suitable compounds such as cationic surfactants of high molecular weight may be used.

These compounds are water-insoluble, oil-dispersible organic nitrogen compounds which are surface-active and which contain a cationic functional group comprising an amino or quaternary nitrogen radical. The organic nitrogen compound, in addition to being surface-active, generally has a long chain group of generally recognized hydrophobic-imparting properties. This group imparts the water insolubility to the compound. The expression "oil-dispersible" includes materials which are oil-soluble. Exemplary of these compounds are:

| Name | Formula and/or Composition |
|---|---|
| Armeen 10 D (Armour) | Primary amine; 90% $C_{10}$; 3% $C_8$; 7% $C_{12}$. |
| Armeen 1120 (Armour) | Primary amine; 90% $C_{12}$; 9% $C_{14}$; 1% $C_{18}$. |
| Armeen 14 (Armour) | Primary amine; 90% $C_{14}$; 4% $C_{12}$; 4% $C_{16}$; 2% $C_{18}$. |
| Armeen 16 (Armour) | Primary amine; 90% $C_{16}$; 6% $C_{18}$; 4% $C_{18}$. |
| Sepamine KW (Ciba) | (*). |
| Hyamine 1622 (Rohm & Haas) | $(CH_3)_3C-CH_2-(CH_3)_2C-\langle\rangle-OCH_2CH_2O-CH_2CH_2-(CH_3)_2N-CH_2\langle\rangle)^+Cl^-$ |
| Sylon (Minn. Mining & Mfg. Co.) | $(RO)(R'O)Si(NH_2)_2$ where R and R' are hydrocarbon radicals. |
| Cetyl dimethyl amine | $C_{16}H_{33}N(CH_3)_2$. |
| Decylamine | $C_{10}H_{21}NH_2$. |
| n-Octylamine | $C_8H_{17}NH_2$. |
| Amine "O" (Alrose Chem. Co.) | 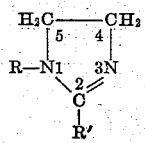 where R' is $C_{17}H_{33}$, and R is $CH_2CH_2OH$. |
| Quaternary "O" (Alrose Chem. Co.) | (structure shown) $Cl^-$ where R' is $C_{17}H_{33}$, and R is $CH_2CH_2OH$. |
| Lecithin | $CH-O-C(O)R$<br>$CH-O-C(O)R'$<br>$CH_2-O-P-O-CH_2-CH_2N(CH_3)_3^+OH^-$<br>$HO \diagup \diagdown O$<br>(possible structure)<br>R and R'=12 to 18 carbon atoms. |
| Cation Active "C" (Victor) | A substituted amide of a $C_{12}$ amide phosphate. |

*The quaternary ammonium salt of an analog of diethyl aminoethylamide hydroacetate.

Especially preferred cationic water-resistant agents are oil-dispersible, water-insoluble alkyl alkylol imidazolines having the general structure

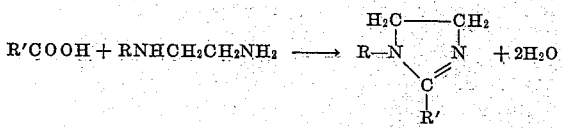

where R is an alkylol group and R' is an alkyl or alkylene group.

These compounds are prepared by reaction of aliphatic acids and hydroxy diamines followed by cyclization, in the following way:

$$R'COOH + RNHCH_2CH_2NH_2 \longrightarrow R-N\diagdown\underset{\underset{R'}{C}}{N} + 2H_2O$$

Hydroxy diamines in which R is of from 1 to about 6 carbon atoms, such as hydroxyethyl and hydroxyisopropyl, are readily available and are preferred. The chain length for R is dependent upon the alcoholic (polar) character of the group; the larger the number of carbon atoms, the more the group takes on the character of a hydrocarbon and loses its alcoholic character. An upper limit of about 18 carbon atoms for R is indicated by this requirement. R', which is derived from an acid, can have from 11 to 21 carbon atoms, such as undecyl, tridecyl, pentadecyl, undecenyl, heptadecyl and heptadecenyl.

Amine "O" is 1-β-hydroxyethyl-2-heptadecenyl imidazoline.

Stable, uniform fluid lubricating compositions can be prepared having a final viscosity with a range of 300 to 1000 modified Furol seconds containing the components of the invention in the following proportions:

| | Per cent |
|---|---|
| Mineral lubricating oil | 60 to 95 |
| Graphite | 2.5 to 35 |
| Inorganic gelling agent or thickener | 0.5 to 5 |
| Stabilizer | [1] 0 to 20 |

[1] By weight of the inorganic thickener.

Numerous compositions have been compounded and found satisfactory by tests, in which each component is held at a constant value while the percentages of the other components are varied within the broader range disclosed above. Thus, any number of combinations of components within the ranges may be used.

A very desirable, stable and viscous lubricant can be prepared in which it is possible to employ only relatively small amounts of graphite and suitable lubricants, consisting essentially of the following ingredients and proportions:

| | Per cent |
|---|---|
| Lubricating oil | 87 to 96 |
| Graphite | 2.5 to 7.5 |
| Inorganic thickener | 1.5 to 5 |
| Stabilizer | 0 to 0.5 |

Preferably, the composition will contain about 4 to 6% graphite and 2.5 or 3.5% thickener and the balance lubricating oil. The heavier oils will, of course, require smaller amounts of the thickener to produce a product of comparable final consistency.

Stable, uniform, more fluid lubricating compositions particularly useful as forge die lubricants can be obtained containing more graphite than the above. Such contain as the essential ingredients a mineral lubricating oil, about 25% powdered graphite and about 0.5–1.5% of the inorganic gelling or thickening agent, such as a silica aerogel or a bentone. With such large amounts of graphite, these proportions are critical, since the use of less than about 0.5% is productive of unstable suspensions, and the addition of amounts exceeding about 1.5% results in excessively viscous compositions above the maximum desirable viscosity which is about 1000 modified Furol seconds.

In the discussion of the preparation of the lubricant, the expression "consisting essentially of" is intended to refer to those ingredients of the composition which give it the particular properties ascribed to it. The expression does not exclude those minor amounts of various additives which are conventionally added to lubricants of the type disclosed, provided the additives do not destroy the particular properties provided by the essential ingredients.

The lubricating compositions of this invention may be prepared by mixing the ingredients in any suitable order and manner in order to obtain a thorough and homogeneous admixture thereof. A preferred method of preparation comprises the steps of agitating the lubricating oil in a mixer, adding thereto the water stabilizer, if desired, while mixing until thoroughly dispersed therein, adding the inorganic gelling and thickening agent and stirring until thoroughly dispersed in said oil; adding the graphite and stirring until the final product is homogeneous and of the desired viscosity. To assist and facilitate the mixing of the products, a recycle pumping system may be employed wherein the product is withdrawn from the bottom of the mixer and returned to the top of the mixer during the mixing of the ingredients. The mixing is continued until the product has a viscosity in the desired range.

The determining factor of the stability and utility of the compositions is the final viscosity of the product, as tested immediately upon the termination of the compounding. The Furol test is similar to the more conventional Saybolt Universal test, except that the standard Universal outlet tip of the Saybolt viscosimeter is substituted with the larger standard Furol outlet tip.

The viscosity test used herein involves the measurement of the time in seconds for 30 cc. of the final lubricant to flow through the Furol tip at 100° F. This time in seconds is referred to herein as the "modified Furol" viscosity, abbreviated as "modified S. S. F." This differs from the standard Furol viscosity test in that the time is measured only for the flow of the first 30 cc. The test is employed in testing heavier oils, in which the flow is, of course, slower by reason of their greater viscosity (see, for example, Abraham, "Asphalts and Allied Substances" (1945), page 964 et seq.).

The length of time of stirring and the temperature at which the lubricant is compounded, as well as the concentration of the ingredients, affect the final viscosity of the product and the stirring should be continued for any particular composition until the viscosity reaches the desired range.

Temperatures at which the lubricant can be satisfactorily compounded are between about 70° and about 212° F. and for the usual compositions 30 to 80 minutes of stirring time will ordinarily be sufficient to produce the final desired viscosity. The composition decreases in viscosity with continued stirring and, since the viscosity also tends to decrease with increased temperatures of preparation, it will normally require the shorter mixing time when compounded at a higher temperature in the range. Also, the final viscosity is affected by the amount of graphite and inorganic thickener employed such that at the higher temperatures of preparation it will generally be preferred to employ the higher ranges of these materials, although the desired viscosity may be realized by controlling the temperature and time of mixing. The final composition has a consistency and appearance comparable to thick, heavy molasses.

In one example of a mode of practicing the present invention in preparing desirable lubricants according to the invention just described, 0.25% Amine "O" was added at 150° F. to a No. 1 Mid-Continent bright stock of 3978 S. S. U. at 100° F. and mixed with a three-blade "Lightnin" stirrer. To this was added 3.5% of the silica aerogel, Santocel "C," and the mixture stirred until a uniform, slightly gelled product was obtained. Powdered graphite to the amount of 5% was worked in until no visible graphite striations were observed. These ingredients were stirred for 30 minutes until a final viscosity of 565 modified S. S. F. for 30 cc. of the composition at 100 F. was obtained.

As another example of a mode of practicing the present invention, 0.25% Amine "O" was added to 74.25% of Mid-Continent bright stock of 210 S. S. U. at 210° F. in a mixing chamber maintained at 150° F. and equipped with a "Lightnin" stirrer having nine blades and rotating at approximately 150 R. P. M., and mixed until homogeneous. To this mixture was added 0.5% of the Santocel "C" described previously, which was again stirred until homogeneous. Finally, 25% No. 39 Acheson graphite powder screened to a fineness of 98±2% through 200 mesh screen was added and mixed therewith for 30 minutes or until all graphite striations had disappeared and the composition had a modified Furol viscosity of 300 seconds.

With 25% graphite, aerogel in amounts greater than 1.5% produces excessively viscous and undesirable lubricants, as clearly shown by Table I below, wherein the test sample containing 1.5% aerogel exhibited a viscosity in excess of 1000 modified Furol seconds, which is considered the maximum desirable viscosity.

It has been found that by controlling the viscosity of the lubricant at the desired range through the extent and time of mixing, a stable product can be obtained. Consequently, by varying the percentage of aerogel within the range of 0.5 to 1.5%, oils of increasing viscosities are obtained as clearly illustrated by Table I, wherein a 25% graphite-containing lubricating oil was used for testing purposes:

TABLE I

| Modified Furol Viscosity at 100° F. | Percent Aerogel |
|---|---|
| Seconds | |
| 255 | 0 |
| 310 | 0.5 |
| 340 | 0.75 |
| 460 | 0.90 |
| 560 | 1.00 |
| 610 | 1.25 |
| 1,150 | 1.50 |

A minimum viscosity of about 300 modified Furol seconds must be maintained in order to prevent sedimentation of the graphite upon standing. A sample of a 25% graphite suspension in Bright Stock having a viscosity of 255 modified Furol seconds was prepared in the absence of any aerogel. After two days of storage, the following results were obtained on sedimentation of various fractions in the sample:

TABLE II
*Sedimentation of 25% graphite in oil*

| Fraction | Percent Total Graphite |
|---|---|
| Top ⅓ | 23.8 |
| Middle ⅓ | 25.4 |
| Lower ⅓ | 50.8 |

A similar sample containing 0.5% aerogel had a viscosity of 310 modified Furol seconds and displayed no measurable sedimentation after seven days' storage. This clearly proves the unusual and unexpected stabilizing effect of aerogel in amounts as low as 0.5%, whereby the graphite particles are suspended in the oil in a stable condition.

A further test of the suspension stability upon storage of the present compositions involves the following technique. Samples of the same type of lubricant containing 25% graphite and varying amounts of aerogel were poured into a 100 cc. graduated cylinder to a height of 3.25 inches. After storage at room temperature for seven days, the top half of the samples were removed by suction and stirred to obtain a homogeneous mixture. A 5 cc. portion of each mixture was diluted to 100 cc. with S. R. naphtha and centrifuged in a pear-shaped centrifuge tube at 2000 R. P. M. for 5 minutes. The quantity of naphtha insolubles separated in cc. over the original amount of insolubles in cc. in each sample represents the percent homogeneity as indicated below:

$$\text{Percent homogeneity} = \frac{\text{cc. top half insolubles} \times 100}{\text{cc. original batch insolubles}}$$

The results of these tests are clearly shown in the table below. It is evident from the data that exceptional suspension stability or homogeneity may be obtained using varying amounts of the silica aerogel within the range of 0.5–1.5%.

TABLE III

| Percent Aerogel | Percent Homogeneity of Lubricant |
|---|---|
| 0.5 | 95 |
| 0.75 | 94 |
| 1.00 | 93 |
| 1.25 | 90 |
| 1.50 | 88 |

This homogeneous condition of the suspension exists even in samples which upon long storage develop a clear supernatant layer of oil on top of the graphite suspension. This separation of base oil from the suspension as a clear supernatant layer, commonly known as bleeding, is another problem encountered in the production of stable suspensions. It has been observed that in all cases the rate of bleeding is fairly rapid at first and then decreases sharply with time. When the supernatant oil is removed from the stored sample, the rate of bleeding increases sharply and then slows down again with the passage of time. This phenomenon indicates that an equilibrium is established between the supernatant oil and the rest of the suspension.

The technique utilized in testing the bleeding stability of the stored samples involves simply recording the height of the supernatant clear oil layer on top of an original 3.25 inch sample stored in a 100 cc. graduated cylinder at room temperature for seven days. The percent bleeding is calculated as follows:

Percent bleeding (vol. separation) =

$$\frac{\text{height supernatant oil} \times 100}{3.25 \text{ inches}}$$

The results obtained on bleeding by using varying amounts of aerogel in the aforedescribed lubricating composition containing 25% graphite are set forth in Table IV below:

TABLE IV

| Percent Aerogel | Percent Bleeding |
|---|---|
| 0.50 | 7 |
| 0.75 | 6 |
| 1.00 | 4 |
| 1.25 | 2 |
| 1.50 | 2 |

It is clear from the data that only minimum amounts of bleeding are encountered using the silica aerogel within the above range. It may further be noted that increasing amounts of the aerogel within the range of 0.5–1.5% resulted in increasing stability to bleeding.

It has also been determined that these lubricating compositions possessing greater stability to bleeding exhibit higher viscosities, which principle is illustrated by the data in Table V below obtained on lubricating compositons of the present invention:

TABLE V

| Percent Bleeding | Modified Furol Viscosity |
|---|---|
| 12 | 250 |
| 7 | 310 |
| 6 | 350 |
| 3.8 | 550 |
| 2.5 | 1,050 |

Thus it may be noted that the viscosity is a direct function of the amount of thickening agent present in the graphite suspension as indicated in Table I, for example, and is inversely proportional due to the rate of bleeding stability of the product as illustrated in Table V.

It is essential, however, that the viscosity of the final product be controlled in order to produce a fluid product, i. e., capable of being sprayed. Consequently, it has been found that lubricants having about 25% graphite in suspension should have a viscosity within the range of about 300 to 1000 modified Furol seconds, and preferably about 350–550 modified Furol seconds. A viscosity above 1000 modified Furol seconds is prohibitively thick and a viscosity below 300 modified Furol seconds is productive of sedimentation and nonuniform suspensions as described previously. In general, for most purposes the desired viscosity is from about 350–550 modified Furol seconds.

Despite the unusual stabilizing effects of the aerogel, some minimum amount of bleeding must be tolerated in the production of lubricants within the viscosity range of 350–550 modified Furol seconds. The mechanism of this separation, however, is clearly not one of sedimentation and does not affect the homogeneity or uniformity of the graphite suspension below the supernatant layer of oil. This would not be the case if the aerogel were not present.

In summary, it will be evident that the incorporation of about 0.5 to 5% of a finely divided silica thickener in a mineral oil lubricating composition containing an amount of graphite on the order of about 2.5 to 35% results in a multiple number of improvements. It is possible thereby to increase the viscosity, improve the homogeneity and stability of the suspension, decrease bleeding, and integrate these factors to insure the required fluidity of the lubricating compositions. On the basis of the various data, it is considered that the determination of a Furol viscosity or its equivalent is the best single means of controlling the preparation of the improved lubricating compositions of the present invention from the three essential ingredients for commercial purposes.

There are other variables affecting the viscosity of the forge die lubricants besides variations in the amounts of the initial ingredients. The shear rate of mixing has a marked effect on the viscosity of the final lubricant, since high rates of shear tend to lower the viscosity and thereby require greater amounts of aerogel to produce as stable a product as prepared by mixing at a lower shear rate. Similarly, an increase in temperature during mixing produces a less viscous lubricant, thereby requiring greater amounts of aerogel to manufacture as viscous a product as one produced at lower mixing temperatures. These factors will be easily taken into consideration by those skilled in the art in determining the extent, nature and time of mixing to achieve the desired viscosity.

It is found that compositions of the present ingredients prepared as described have, in spite of the relatively small amount of graphite employed, excellent lubricating properties; are very stable suspensions; and possess properties superior in many respects as a lubricating composition than related compositions of much larger concentrations of graphite and other stabilizing agents. This is especially important from a commercial standpoint where the graphite which is used is considerably more expensive per unit quantity than the lubricating oils which are generally used in the compositions. The present compositions may be readily spread or brushed on the heated surfaces of the dies, described above, and form thereon a uniform and highly satisfactory layer of graphite for the working of the dies. A particularly desirable feature of the present lubricants is that they retain their stability at very high temperatures in contrast to many of the previous compositions.

It is also found that where the improved lubricants according to the present invention are employed, the forging and extrusion dies have a life of about 30% longer than is usually realized with other lubricants. While not intending to be limited to any theory, it may be that the greater die life is realized as a result of the particular combination and proportions of the graphite and gelling agent, particularly silica aerogel.

While the invention has been described with reference to specific embodiments, it will be apparent to those skilled in the art that various modifications may be made and equivalents substituted therefor without departing from the principles and true nature of the present invention.

This application is a continuation-in-part of Serial Nos. 218,277, filed March 29, 1951, and 277,288, filed March 18, 1952.

We claim:

1. A stable uniform fluid lubricant composition containing as the principal and essential ingredients, a major proportion of a mineral lubricating oil, about 2.5 to about 35% powdered graphite, about 0.5 to about 5% of a finely-divided inorganic oil thickener, and having a viscosity of 300 to 1000 modified S. S. F. at 100° F.

2. An improved forge die lubricant composition consisting essentially of a mixture of a mineral lubricating oil base stock of from 150° to 9000 S. S. U. viscosity at 100° F., graphite and a finely-divided inorganic oil thickener of the following proportions:

| | Percent |
|---|---|
| Mineral lubricating oil | 96 –87.5 |
| Graphite | 2.5– 7.5 |
| Inorganic oil thickener | 1.5– 5 | compounded by stirring said ingredients at a temperature between about 70° and about 212° F. to a final viscosity for the composition of 450 to 650 modified S. S. F. at 100° F.

3. A composition according to claim 2 containing 0 to 0.5% of a nitrogen base cationic surface-active water-stabilizing agent.

4. The composition of claim 2 in which said lubricating oil base stock is a bright stock of from 3000–5000 S. S. U. viscosity at 100° F.

5. The composition of claim 2 in which said inorganic thickener is finely divided silica.

6. The composition of claim 2 in which said inorganic thickened is an inorganic aerogel.

7. The composition of claim 6 in which said inorganic aerogel is silica aerogel.

8. A forge die lubricant consisting of the following ingredients:

| | Percent |
|---|---|
| Bright Oil Stock | 91.5 |
| Flake graphite | 5 |
| Finely divided silica aerogel | 3.5 | compounded at 150° F. to a final consistency of 565 modified S. S. F. at 100° F.

9. A forge die lubricant consisting of the following ingredients:

| | Percent |
|---|---|
| Bright Oil Stock | 91.25 |
| Flake graphite | 5. |
| Finely divided silica aerogel | 3.5 |
| Alkylated glyoxalidine | 0.25 | compounded at 150° F. to a final consistency of 565 modified S. S. F. at 100° F.

10. A stable, uniform, fluid lubricant composition containing as the principal and essential ingredients a major proportion of a mineral lubricating oil, about 15 to 35% powdered graphite and about 0.5–1.5% finely divided silica aerogel, and having a viscosity of 300 to 1000 modified S. S. F. at 100° F.

11. A stable, uniform, fluid lubricant composition having a viscosity of 380 to 550 modified S. S. F. at 100° F. and containing as the principal and essential ingredients a major proportion of a mineral lubricating oil, about 25% powdered graphite and about 0.5–1.5% finely divided silica aerogel having the following properties:

| | |
|---|---|
| pH | 3.5–5.0. |
| Average secondary agglomerate particle size before mixing | 1–6 microns. |
| Average particle size after simple mixing with the oil | Max. of about 0.25 micron. |
| $SiO_2$ | 93–96%. |
| Total volatiles | 0.5–4.0% (after heating at 800° C. for ½ hr.). |

12. A stable, uniform, fluid lubricant composition containing as the principal and essential ingredients a major proportion of a mineral lubricating oil, about 25% powdered graphite and about 0.5–1.5% finely divided devolatilized and reductionized silica aerogel, said lubricant having a viscosity of 300 to 1000 modified S. S. F. at 100° F.

13. A stable, uniform, fluid forge die lubricant containing as the essential and principal ingredients a major proportion of a mineral lubricating oil, about 25% powdered graphite and about 0.5–1.5% finely divided devolatilized and reductionized silica aerogel, said lubricant having a viscosity of about 350 to 550 modified S. S. F. at 100° F.

14. A stable, uniform, fluid lubricant composition having a viscosity of 300 to 1000 modified S. S. F. at 100° F. containing as the principal and essential ingredients a major proportion of a mineral lubricating oil, about 25% powdered graphite, about 0.5–1.5% finely-divided silica aerogel and about 5–20% by weight of said aerogel of a nitrogen base cationic surface-active water-stabilizing agent.

15. A stable, uniform, fluid lubricant composition having a viscosity of 350 to 550 modified S. S. F. at 100° F. containing as the principal and essential ingredients a major proportion of a mineral lubricating oil, about 25% powdered graphite, about 0.5–1.5% finely-divided silica aerogel and about 5–20% by weight of said aerogel of an oil-dispersible, water-insoluble alkyl alkylol imidazoline having the following structure:

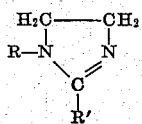

where R is an alkylol group and R' is selected from the group consisting of alkyl and alkylene groups.

References Cited in the file of this patent

UNITED STATES PATENTS

| | | |
|---|---|---|
| 2,554,222 | Stross | May 22, 1951 |
| 2,655,476 | Hughes et al. | Oct. 13, 1953 |

OTHER REFERENCES

Metal Working Ludricants, by Bastian, McGraw-Hill Pub. Co. Inc., New York, N. Y., 1951; pages 144–150. (Copy in Scientific Library.)